(12) United States Patent
Shin

(10) Patent No.: US 11,222,328 B2
(45) Date of Patent: Jan. 11, 2022

(54) METHOD FOR PROVIDING MOBILE GIFT CARD ISSUANCE SERVICE, AND SERVER APPARATUS AND SYSTEM THEREFOR

(71) Applicant: PLATFOS CO., LTD., Seongnam-si (KR)

(72) Inventor: Young Joon Shin, Yongin-si (KR)

(73) Assignee: PLATFOS CO., LTD., Seongnam-si (KR)

(*) Notice: Subject to any disclaimer, the term of this patent is extended or adjusted under 35 U.S.C. 154(b) by 0 days.

(21) Appl. No.: 16/768,405

(22) PCT Filed: Oct. 26, 2018

(86) PCT No.: PCT/KR2018/012840
§ 371 (c)(1),
(2) Date: May 29, 2020

(87) PCT Pub. No.: WO2019/107754
PCT Pub. Date: Jun. 6, 2019

(65) Prior Publication Data
US 2020/0334664 A1    Oct. 22, 2020

(30) Foreign Application Priority Data

Nov. 29, 2017 (KR) .................. 10-2017-0161302

(51) Int. Cl.
*G06K 5/00* (2006.01)
*G06Q 20/34* (2012.01)

(52) U.S. Cl.
CPC ......... *G06Q 20/351* (2013.01); *G06Q 20/348* (2013.01)

(58) Field of Classification Search
CPC ......... G06F 17/03; G06F 17/32; G06Q 20/20; G06Q 20/387
USPC .................. 235/380, 382, 383, 379
See application file for complete search history.

(56) References Cited

U.S. PATENT DOCUMENTS

| | | | |
|---|---|---|---|
| 7,567,934 B2* | 7/2009 | Flitcroft | G06Q 20/24 705/37 |
| 7,647,252 B2* | 1/2010 | Rampell | G06Q 30/0253 705/26.4 |
| 8,024,249 B2* | 9/2011 | Sato | G06Q 40/04 705/36 R |

(Continued)

FOREIGN PATENT DOCUMENTS

| KR | 10-2012-0078975 A | 7/2012 |
|---|---|---|
| KR | 10-2013-0062423 A | 6/2013 |

(Continued)

*Primary Examiner* — Daniel St Cyr
(74) *Attorney, Agent, or Firm* — Novick, Kim & Lee, PLLC; Sang Ho Lee; Hyun Woo Shin

(57) ABSTRACT

Provided is a method for providing a mobile gift card issuance service, and a server apparatus and a system therefor, the method including the steps of: receiving, from a product terminal, product information on a product for which a mobile gift card is to be issued; generating a random number corresponding to the received product information; generating a code by using the generated random number; associating the generated random number and code with the product information and storing the same as mobile gift card information; and transmitting the mobile gift card information to a sales channel server.

7 Claims, 5 Drawing Sheets

(56) References Cited

U.S. PATENT DOCUMENTS

| | | | | |
|---|---|---|---|---|
| 8,346,668 B2* | 1/2013 | Fujita | ............... | G06Q 20/3829 |
| | | | | 705/67 |
| 8,590,785 B1* | 11/2013 | Mesaros | ............ | G06Q 30/0277 |
| | | | | 235/383 |
| 9,317,018 B2* | 4/2016 | Spodak | ................ | G06K 19/072 |
| 10,460,364 B2* | 10/2019 | Erke | ................. | G06Q 30/0601 |
| 2005/0273392 A1* | 12/2005 | Ahn | ................... | G06Q 30/0633 |
| | | | | 705/26.1 |
| 2012/0278232 A1* | 11/2012 | Randazza | .............. | G06Q 20/02 |
| | | | | 705/41 |

FOREIGN PATENT DOCUMENTS

| KR | 10-2015-0020485 A | 2/2015 |
|---|---|---|
| KR | 10-2015-0093886 A | 8/2015 |
| KR | 10-2017-0004614 A | 1/2017 |

\* cited by examiner

METHOD FOR PROVIDING MOBILE GIFT CARD ISSUANCE SERVICE, AND SERVER APPARATUS AND SYSTEM THEREFOR

TECHNICAL FIELD

The present invention relates to a method of providing a service which allows to conveniently issue a mobile gift certificate.

BACKGROUND ART

A gift certificate is a kind of ticket that contains a predetermined amount of monetary value, and is mainly used by a corresponding company as a means for inducing promotion and purchase of the company's products. It is also used as a user-to-user or user-to-company gift.

In particular, as the base of using the gift certificate has been expanded recently, marketing promotion using the gift certificates is intensified in offline areas such as traditional markets or the like, as well as department stores and franchise stores, and online fields of digital contents (games, music, shopping, etc.). In addition, owing to development of technology and spread of mobile terminals such as smartphones, the gift certificates are issued and distributed in the form of mobile gift certificates, exchange vouchers, discount vouchers, and money vouchers (hereinafter referred to as 'mobile gift certificates').

However, although a business operator who desires to issue a mobile gift certificate attempts to construct a mobile gift certificate issuance system by himself or herself, the environment does not allow the business operator to construct their own system without hesitation due to the burdens such as the high development cost, development period, and the need of establishing an operation and management department. Accordingly, the operator has no choice but to consult some mobile gift certificate companies to issue a mobile gift certificate, and there is an inconvenience in that the business operator should obtain permission of the mobile gift certificate companies in practice to issue the mobile gift certificate.

In addition, as a mobile gift certificate company receives product information in the form of a document or a file and manually registers the product information in an issuance system manager page, there is a problem of requiring a lot of time and management personnel to register and manage a large amount of product information.

DISCLOSURE OF INVENTION

Technical Problem

Therefore, the present invention has been made in view of the above problems, and it is an object of the present invention to provide a method of providing a mobile gift certificate issuance service, a server device and a system therefor, which allow a product supplier to easily issue a mobile gift certificate.

Technical Solution

To accomplish the above object, according to one aspect of the present invention, there is provided a method of providing a mobile gift certificate issuance service, the method comprising the steps of: receiving, from a product supplier terminal, information on a product for which a mobile gift certificate is to be issued; generating a random number corresponding to the received product information; generating a code using the generated random number; linking the generated random number and code to the product information and storing the linked information as mobile gift certificate information; and transmitting the mobile gift certificate information to a sales channel server.

A server device according to an embodiment of the present invention performs the method of providing a mobile gift certificate issuance service.

Meanwhile, the method of providing a mobile gift certificate issuance service or at least some of the steps of the method may be embodied as a computer-readable recording medium that records a program for executing the method on a computer, or may be provided as the program itself.

In addition, according to another aspect of the present invention, there is provided a system for providing a mobile gift certificate issuance service, the system comprising: a product supplier terminal for selecting a product for which a mobile gift certificate is to be issued; a sales channel server for providing information on an issued mobile gift certificate and selling the mobile gift certificate; and a gift certificate server for receiving information on the selected product from the product supplier terminal, generating a random number corresponding to the received product information, generating a code using the generated random number, linking the random number and the code to the product information and stores the linked information as mobile gift certificate information, and transmitting the mobile gift certificate information to the sales channel server.

Advantageous Effects

According to an embodiment of the present invention, as a system for issuing and managing mobile gift certificates is configured as a platform so that a product supplier may autonomously issue mobile gift certificates, there is an advantage of collectively and automatically registering all products only by simply applying for issuance through a real-time connection between a platform server and a product DB server of the products.

In addition, as a large number of supplier use a cloud-type platform, there is an effect of reducing the initial construction cost, reducing the development period, and reducing the operating resources, and it is possible to expand the number of business operators who can issue mobile gift certificates, such as operators of restaurants, small and medium-sized businesses and the like, expand the products, and expand the mobile gift certificate market.

BEST MODE FOR CARRYING OUT THE INVENTION

Figure 1:
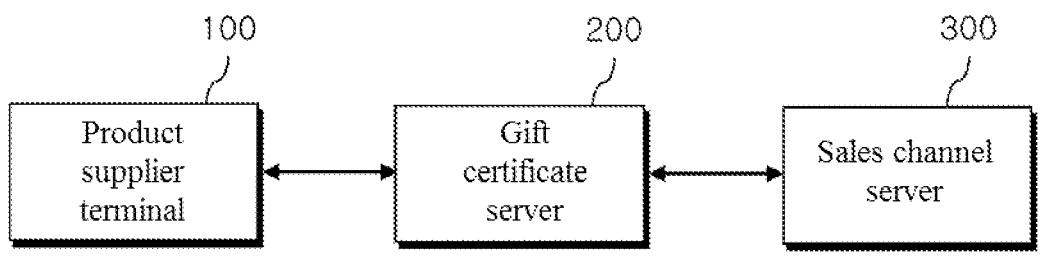
FIG. 1 is a block diagram showing the configuration of a system for providing a mobile gift certificate issuance service according to an embodiment of the present invention.

Hereinafter, a method of providing a mobile gift certificate issuance service according to an embodiment of the present invention, a server device and a system therefor will be described in detail with reference to the accompanying drawings.

In describing the present invention below, when it is determined that detailed descriptions of related well-known functions or configurations may unnecessarily obscure the gist of the present invention, detailed descriptions thereof will be omitted. In addition, the terms described below are terms defined in consideration of the functions in the present invention, and may vary according to a user's or operator's intention or practice. Therefore, the definition should be made based on the overall contents in the present invention.

In addition, a preferred embodiment of the present invention implemented below is previously provided in each system functional configuration to efficiently describe the technical components constituting the present invention, or the system functional configurations commonly provided in the technical field to which the present invention pertains are omitted as much as possible, and it will be described focusing on the functional configurations that should be additionally provided for the present invention.

Those skilled in the art may easily understand the functions of the components previously used in the prior art among the functional configurations omitted and not shown below, and also clearly understand the relation between the components omitted as described above and components added for the present invention.

A mobile gift certificate issuance system according to an embodiment of the present invention is based on providing a service of a state capable of communicating each other between a product DB of a product supplier and a mobile gift certificate issuance server through real-time interconnection, and this includes the steps of: selecting and transmitting product information of the product supplier; receiving corresponding product information from the mobile gift certificate issuance server; automatically checking consistency of the product information; issuing a PIN (random number) of the product information of which the consistency has been confirmed; outputting the issued PIN as various recognizable codes; mapping the issued PIN (random number) and barcode to the product information and storing the mapped information; transmitting an issued mobile gift certificate to a sales channel server; and automatically identifying whether the product information transmitted to the sales channel server is normally reflected.

In addition, a method of selling and operating a mobile gift certificate according to an embodiment of the present invention is accomplished through communication between a mobile gift certificate issuance server and a sales channel company server, and the method includes the steps of: transmitting mobile gift certificate issuance information to the sales channel company server, by the mobile gift certificate issuance server; exposing and displaying the mobile gift certificate in a sellable state, by a mobile sales channel server; transmitting and receiving a sold mobile gift certificate to a consumer's portable terminal device; collecting information on the mobile gift certificate by inputting a barcode or PIN information of the received mobile gift certificate through a POS terminal or a website of the product supplier; checking validity of the mobile gift certificate by transmitting information on the mobile gift certificate collected through the POS terminal or the website of the product supplier to the mobile gift certificate issuance server; and transmitting a validity verification result to the POS terminal or the website of the product supplier, by the mobile gift certificate issuance server.

Hereinafter, embodiments of the present invention will be described in detail with reference to the accompanying drawings.

FIG. 1 is a block diagram showing the configuration of a system for providing a mobile gift certificate issuance service according to an embodiment of the present invention, and the system for providing a mobile gift certificate issuance service may include a product supplier terminal 100, a gift certificate server 200, and a sales channel server 300.

Referring to FIG. 1, the product supplier terminal 100 is a terminal for receiving a selection of a product for which a mobile gift certificate is to be issued, and the sales channel server 300 is a server for providing information on an issued mobile gift certificate and selling the mobile gift certificate.

Meanwhile, the gift certificate server 200 receives information on the selected product from the product supplier terminal, generates a random number corresponding to the received product information, generates a code using the generated random number, links the random number and the code to the product information and stores the linked information as mobile gift certificate information, and transmits the mobile gift certificate information to the sales channel server.

Here, the mobile gift certificate means a gift certificate of a data form that can be stored in a memory, not in the form of diverse existing papers or plastic cards, which is used in a method of storing the mobile gift certificate in a terminal device such as a cellular phone, and making a payment by presenting the gift certificate stored in the terminal device when a product is purchased at a store, and the mobile gift certificate may be, for example, an exchange voucher, a discount voucher, or a money voucher.

Figure 2:
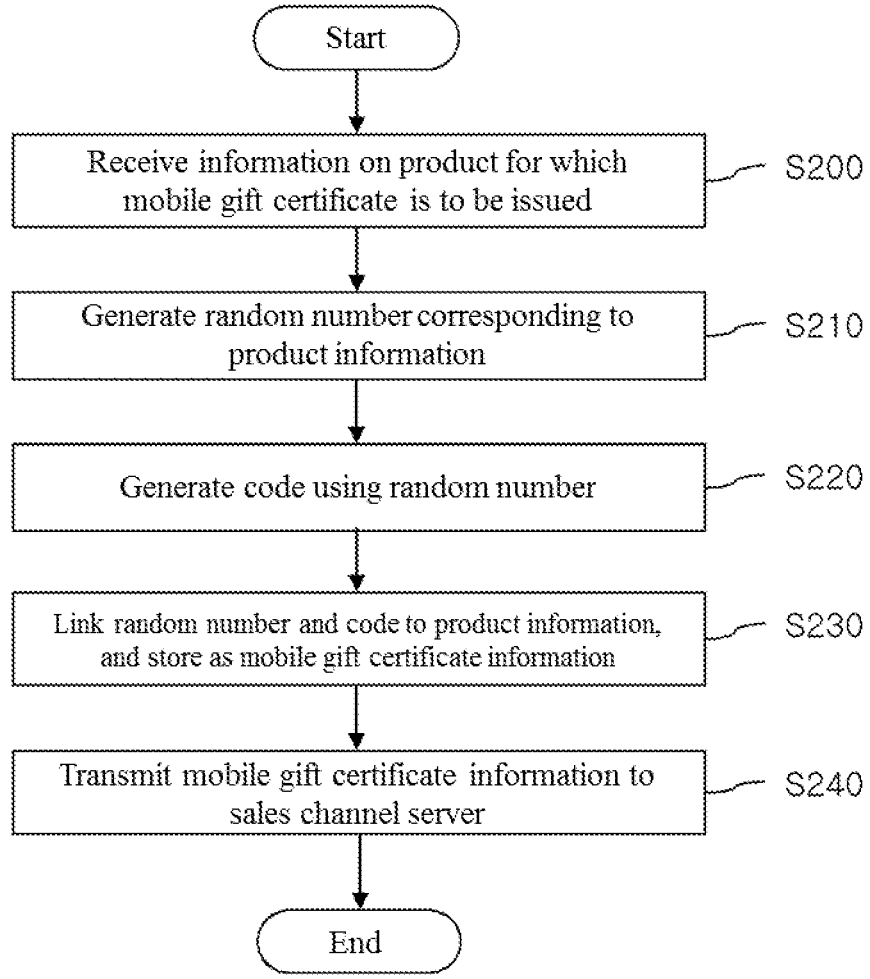
FIG. 2 is a flowchart illustrating a method of providing a mobile gift certificate issuance service according to an embodiment of the present invention.

FIG. 2 is a flowchart illustrating a method of providing a mobile gift certificate issuance service according to an embodiment of the present invention, and the operation of the gift certificate server 200 will be described in detail with reference to FIG. 2.

The gift certificate server 200 receives information on a product, for which a mobile gift certificate is to be issued, from the product supplier terminal 100 (step S200).

Then, the gift certificate server 200 generates a random number corresponding to the received product information (step S210), and generates a code using the generated random number (step S220).

Here, the random number is a PIN, and the code may include various codes such as a barcode, a QR code and the like.

The gift certificate server 200 links the generated random number and code to the product information and stores the linked information as mobile gift certificate information (step S230), and transmits the mobile gift certificate information to the sales channel server 300 (step S240).

Meanwhile, a process of confirming consistency of the received product information may be performed between the steps S200 and S210.

In addition, after step S240, the gift certificate server 200 may automatically identify whether or not the mobile gift certificate information transmitted to the sales channel server is normally reflected.

Figure 3:
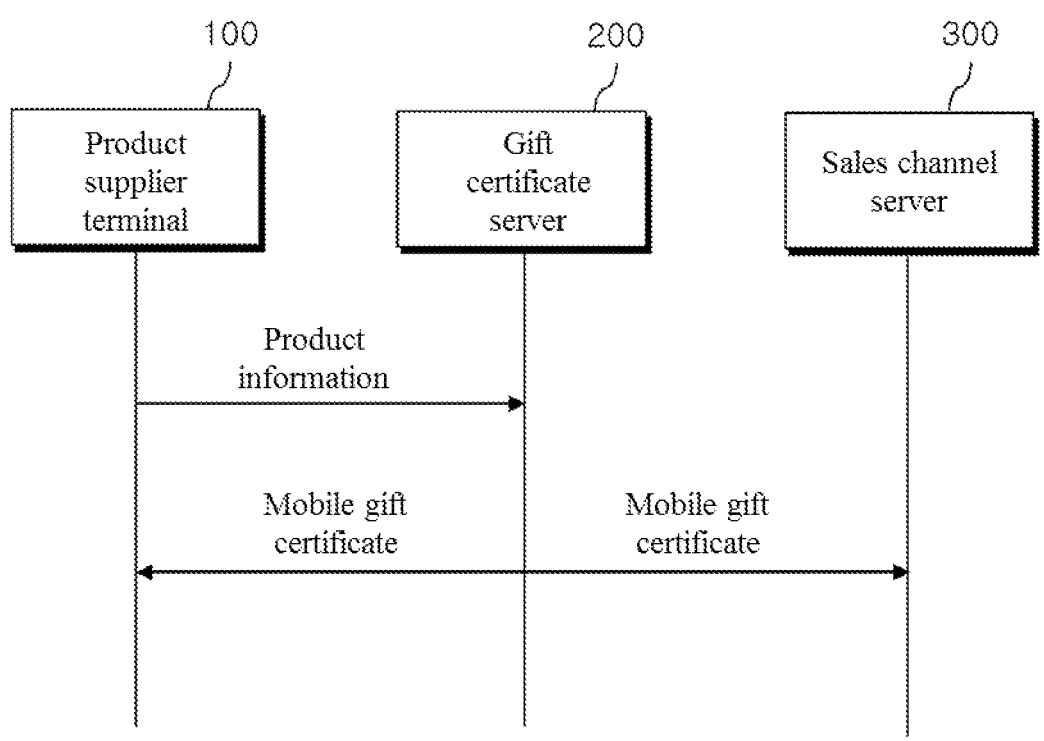
FIGS. 3 and 4 are timing diagrams illustrating methods of providing a mobile gift certificate issuance service according to an embodiment of the present invention.

Through the process of issuing a mobile gift certificate as described above, as shown in FIG. 3, product information is transmitted from the product supplier terminal 100 to the gift certificate server 200, and the gift certificate server 200 may transfer a mobile gift certificate issued using the transferred product information to the product supplier terminal 100 and the sales channel server 300.

Figure 4:
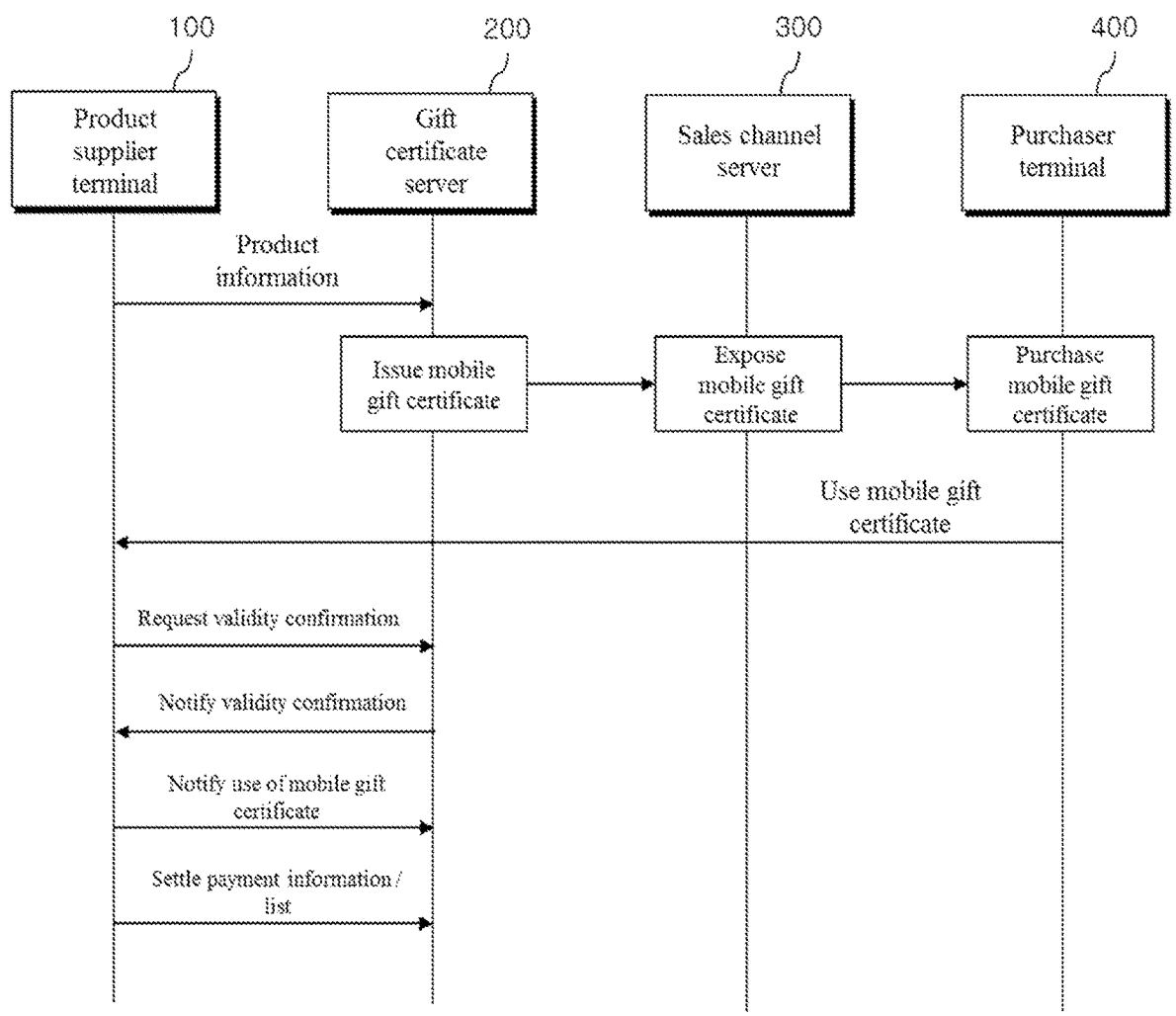

According to another embodiment of the present invention, as shown in FIG. 4, for the sale and use of the mobile gift certificate issued as described above, the gift certificate server 200 may receive the used mobile gift certificate information from the product supplier terminal 100 or a web server corresponding to the website using at least one among the random number and the code, verify validity of the received mobile gift certificate information, and transmit information on a validity verification result to the product supplier terminal 100 or the web server.

In addition, the product supplier terminal 100 may be a point of sale (POS) terminal (not shown) connected to a value-added network (VAN) server (not shown), and in this case, the product information is transmitted from the POS terminal to be received by the gift certificate server 200 through the VAN server.

Figure 5:
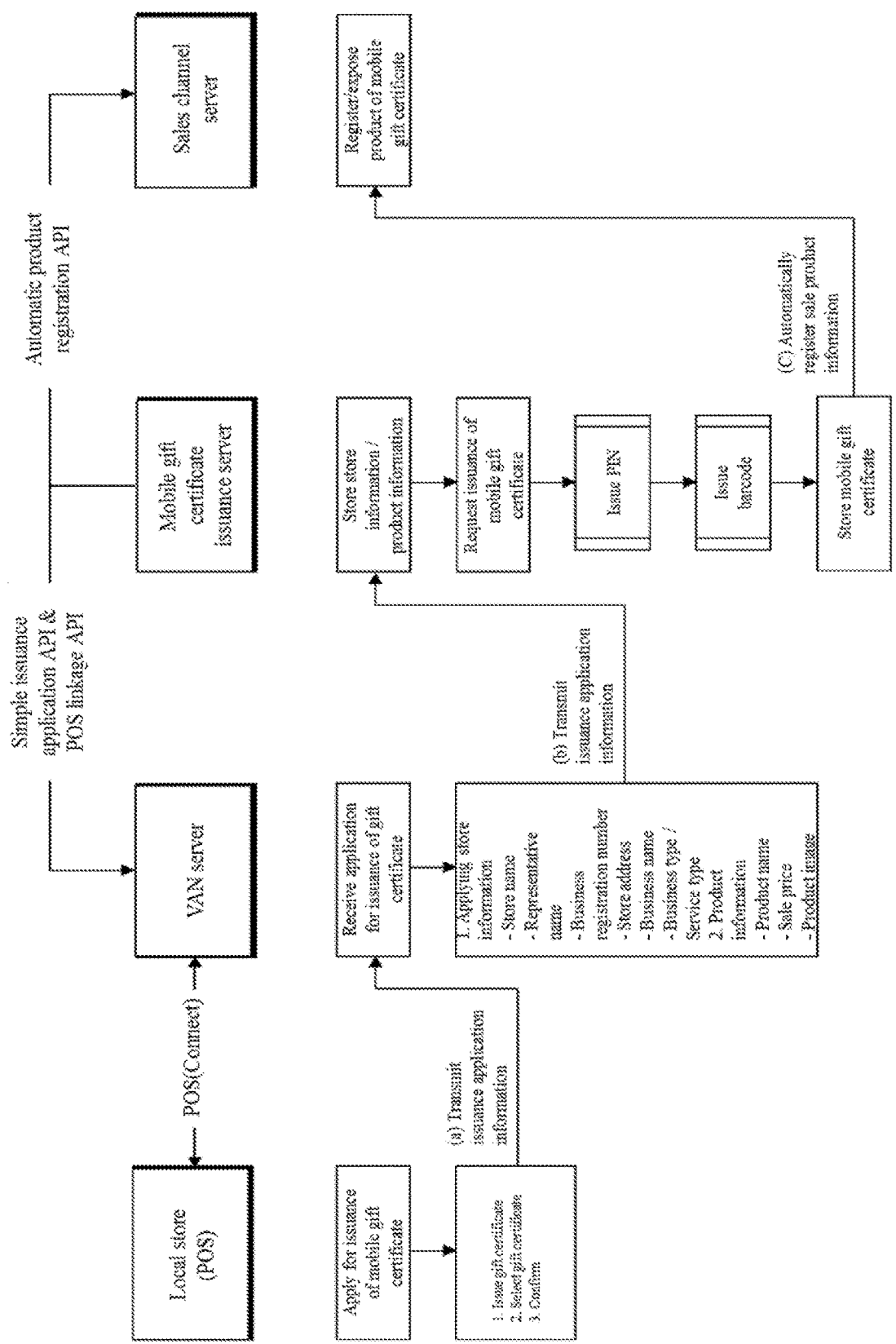
FIG. 5 is a view illustrating an embodiment of a method of issuing a mobile gift certificate in a system for providing a mobile gift certificate issuance service according to the present invention.

FIG. 5 is a view illustrating an embodiment of a method of issuing a mobile gift certificate in a system for providing a mobile gift certificate issuance service according to the present invention, and descriptions the same as those described with reference to FIGS. 1 to 4 among the methods shown in the drawings will be omitted below.

Referring to FIG. 5, an application for issuing a mobile gift certificate may be made at a client POS terminal of a local store, which is a franchise store of a VAN or POS company, through application programming interface (API) interconnection between a VAN or POS company server and a mobile gift certificate issuance server.

In this case, product information of a corresponding store is extracted from a product database of a corresponding VAN or POS company and transmitted to the mobile gift certificate issuance server, and the mobile gift certificate issuance server may issue a mobile gift certificate in real-time through a mobile gift certificate issuance system so that the product may be exposed and displayed on an online sales channel affiliated in advance and linked in real-time.

Figure 6:
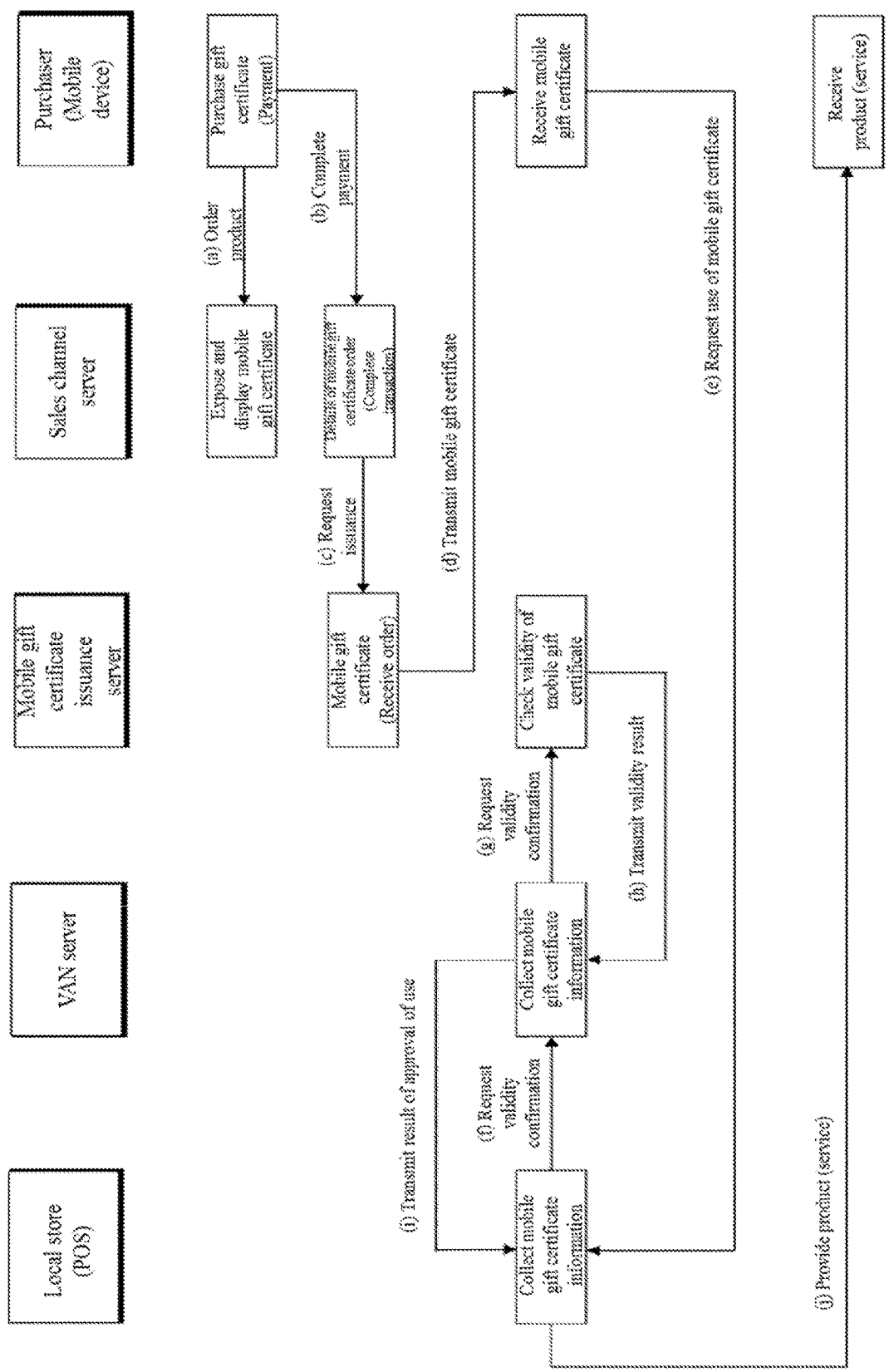
FIG. 6 is a view illustrating an embodiment of a method of selling and using a mobile gift certificate in a system for providing a mobile gift certificate issuance service according to the present invention.

FIG. 6 is a view illustrating an embodiment of a method of selling and using a mobile gift certificate in a system for providing a mobile gift certificate issuance service according to the present invention, and descriptions the same as those described with reference to FIGS. 1 to 5 among the methods shown in the drawings will be omitted below.

Referring to FIG. 6, an issued mobile gift certificate is sold through a mobile gift certificate sales channel affiliated in advance, and a user who has purchased the mobile gift certificate may use the mobile gift certificate through a validity verification process or the like at a mobile gift certificate issuer (local store).

The method of providing a mobile gift certificate issuance service according to the present invention described above may be manufactured as a program for being executed on a computer and stored in a computer-readable recording medium. Examples of the computer-readable recording medium include ROM, RAM, and CD-ROM, magnetic tapes, floppy disks, optical data storage devices and the like.

The computer-readable recording medium may be distributed in computer systems connected through a network, and computer-readable codes may be stored and executed in a distributed manner. In addition, function programs, codes, and code segments for implementing the method may be easily inferred by programmers in the technical field to which the present invention pertains.

In addition, although a preferred embodiment of the present invention has been shown and described above, the present invention is not limited to the specific embodiment described above, and various modified embodiment can be made by those skilled in the art without departing from the gist of the present invention claimed in the claims. In addition, these modifications should not be individually understood from the technical spirit or prospect of the present invention.

The invention claimed is:

1. An operation method of a mobile gift certificate issuance server for providing a mobile gift certificate issuance service, the method comprising the steps of:
   receiving, from a product supplier terminal, product information for which a mobile gift certificate is to be issued;
   generating a random number corresponding to the received product information;
   generating a code using the generated random number;
   linking the generated random number and the code to the product information and storing the linked information as mobile gift certificate information; and
   transmitting the mobile gift certificate information to a sales channel server,
   wherein the product supplier terminal is a client point of sale (POS) terminal of a local store, which is a franchise store of a value-added network (VAN) or POS company,
   wherein the receiving comprises receiving the product information through application programming interface (API) interconnection of a mobile gift certificate issuance system between a VAN or POS company server and the mobile gift certificate issuance server,
   wherein the product information of the franchise store is extracted from a product database of the VAN or POS company server and transmitted to the mobile gift certificate issuance server, and
   wherein the mobile gift certificate issuance server transmits the mobile gift certificate in real-time through the mobile gift certificate issuance system and the product information is exposed and displayed on an online sales channel provided by the sales channel server which is affiliated in advance and linked in real-time with the mobile gift certificate issuance system.

2. The method according to claim 1, further comprising the step of checking consistency of the received product information.

3. The method according to claim 1, further comprising the step of identifying whether or not the mobile gift certificate information transmitted to the sales channel server is normally reflected.

4. The method according to claim 1, further comprising the step of:
   receiving used mobile gift certificate information from the product supplier terminal or a web server using at least one among the random number and the code;
   verifying validity of the received mobile gift certificate information; and
   transmitting information on a validity verification result to the product supplier terminal or the web server.

5. A mobile gift certificate issuance server for providing a mobile gift certificate issuance service, wherein the mobile gift certificate issuance server performs an operation method comprising the steps of:
- receiving, from a product supplier terminal, product information for which a mobile gift certificate is to be issued;
- generating a random number corresponding to the received product information;
- generating a code using the generated random number;
- linking the generated random number and the code to the product information and storing the linked information as mobile gift certificate information; and
- transmitting the mobile gift certificate information to a sales channel server,
- wherein the product supplier terminal is a client point of sale (POS) terminal of a local store, which is a franchise store of a value-added network (VAN) or POS company,
- wherein the receiving comprises receiving the product information through application programming interface (API) interconnection of a mobile gift certificate issuance system between a VAN or POS company server and the mobile gift certificate issuance server,
- wherein the product information of the franchise store is extracted from a product database of the VAN or POS company server and transmitted to the mobile gift certificate issuance server, and
- wherein the mobile gift certificate issuance server transmits the mobile gift certificate in real-time through the mobile gift certificate issuance system and the product information is exposed and displayed on an online sales channel provided by the sales channel server which is affiliated in advance and linked in real-time with the mobile gift certificate issuance system.

6. A mobile gift certificate issuance server for issuing a mobile gift certificate, the system comprising:
- a product supplier terminal for selecting a product for which a mobile gift certificate is to be issued;
- a sales channel server for providing information on an issued mobile gift certificate and selling the mobile gift certificate; and
- a mobile gift certificate issuance server for receiving information on the selected product from the product supplier terminal, generating a random number corresponding to the received product information, generating a code using the generated random number, linking the random number and the code to the product information and storing the linked information as mobile gift certificate information, and transmitting the mobile gift certificate information to the sales channel server,
- wherein the product supplier terminal is a client point of sale (POS) terminal of a local store, which is a franchise store of a value-added network (VAN) or POS company,
- wherein the receiving comprises receiving the product information through application programming interface (API) interconnection of a mobile gift certificate issuance system between a VAN or POS company server and the mobile gift certificate issuance server,
- wherein the product information of the franchise store is extracted from a product database of the VAN or POS company server and transmitted to the mobile gift certificate issuance server, and
- wherein the mobile gift certificate issuance server transmits the mobile gift certificate in real-time through the mobile gift certificate issuance system and the product information is exposed and displayed on an online sales channel provided by the sales channel server which is affiliated in advance and linked in real-time with the mobile gift certificate issuance system.

7. The system according to claim 6, wherein the mobile gift certificate issuance server receives used mobile gift certificate information from the product supplier terminal or a web server using at least one among the random number and the code, verifies validity of the received mobile gift certificate information, and transmits information on a validity verification result to the product supplier terminal or the web server.

\* \* \* \* \*